(12) United States Patent
Lomax et al.

(10) Patent No.: US 8,240,358 B2
(45) Date of Patent: Aug. 14, 2012

(54) METHOD AND DEVICE FOR MINIMIZING ADVERSE EFFECTS OF TEMPERATURE DIFFERENTIAL IN A HEAT EXCHANGER OR HEAT EXCHANGE REACTOR

(75) Inventors: Franklin D. Lomax, Boyds, MD (US); Christopher H. Van Dyke, Washington, DC (US)

(73) Assignee: L'Air Liquide Societe Anonyme pour l'Etude Et l'Exploitation des Procedes Georges Claude, Paris (FR)

( * ) Notice: Subject to any disclaimer, the term of this patent is extended or adjusted under 35 U.S.C. 154(b) by 892 days.

(21) Appl. No.: 12/239,415

(22) Filed: Sep. 26, 2008

(65) Prior Publication Data
US 2010/0078158 A1 Apr. 1, 2010

(51) Int. Cl.
F28F 11/00 (2006.01)
F28D 7/10 (2006.01)
(52) U.S. Cl. .......................... 165/11.1; 165/70; 165/140
(58) Field of Classification Search ................ 165/11.1, 165/70, 104.14, 140, 141, 159, 161, 162, 165/166
See application file for complete search history.

(56) References Cited

U.S. PATENT DOCUMENTS

| | | | |
|---|---|---|---|
| 514,935 A * | 2/1894 | Kersenbrock | 165/159 |
| 3,446,594 A | 5/1969 | Buswell et al. | |
| 4,972,902 A * | 11/1990 | Ninomiya | 165/70 |
| 5,733,347 A | 3/1998 | Lesieur | |
| 6,497,856 B1 | 12/2002 | Lomax, Jr. et al. | |
| 6,896,041 B2 | 5/2005 | Lomax, Jr. et al. | |
| 6,957,695 B2 | 10/2005 | Lomax, Jr. et al. | |
| 7,117,934 B2 | 10/2006 | Lomax, Jr. et al. | |
| 2005/0194120 A1* | 9/2005 | Lomax et al. | 165/100 |
| 2008/0118413 A1 | 5/2008 | Lomax et al. | |

* cited by examiner

Primary Examiner — Ljiljana Ciric
(74) Attorney, Agent, or Firm — Elwood L. Haynes

(57) ABSTRACT

A heat exchange apparatus includes first and second sections, and further includes a first cross-flow fluid passageway disposed at least partially within the first section, defined by an internal surface of the first section, and including an inlet and outlet. The apparatus also includes a second cross-flow fluid passageway disposed at least partially within the second section and including an inlet and an outlet. The apparatus includes an interior fluid passageway with at least one tube disposed at least partially within the first section and at least partially within the second section, extending at least partially through the first passageway and at least partially through the second passageway, and including at least an inlet and an outlet. A sealing zone is disposed between the first section and the second section. The sealing zone isolates the first section from the second section either or both mechanically and in fluid communication.

3 Claims, 11 Drawing Sheets

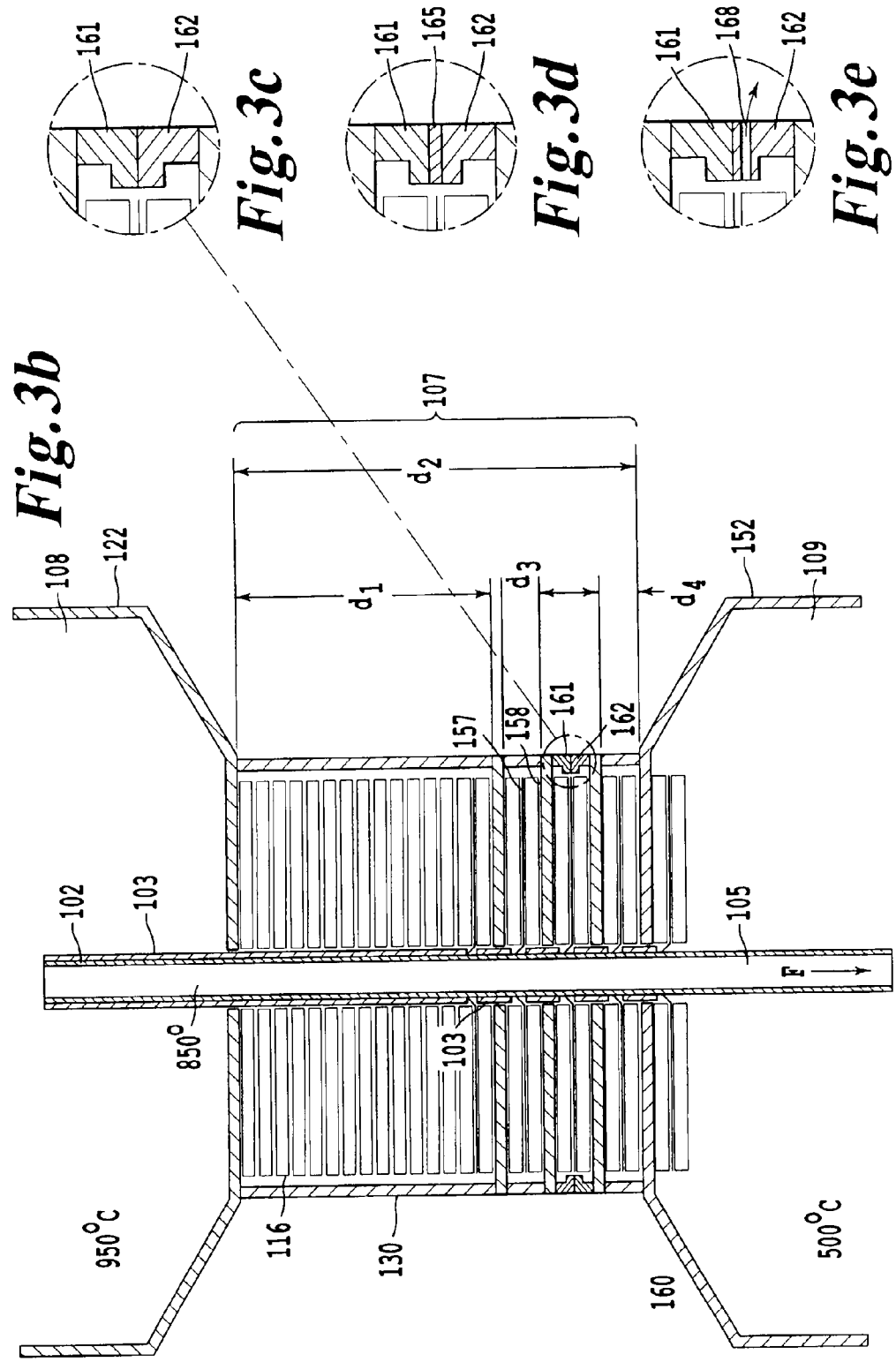

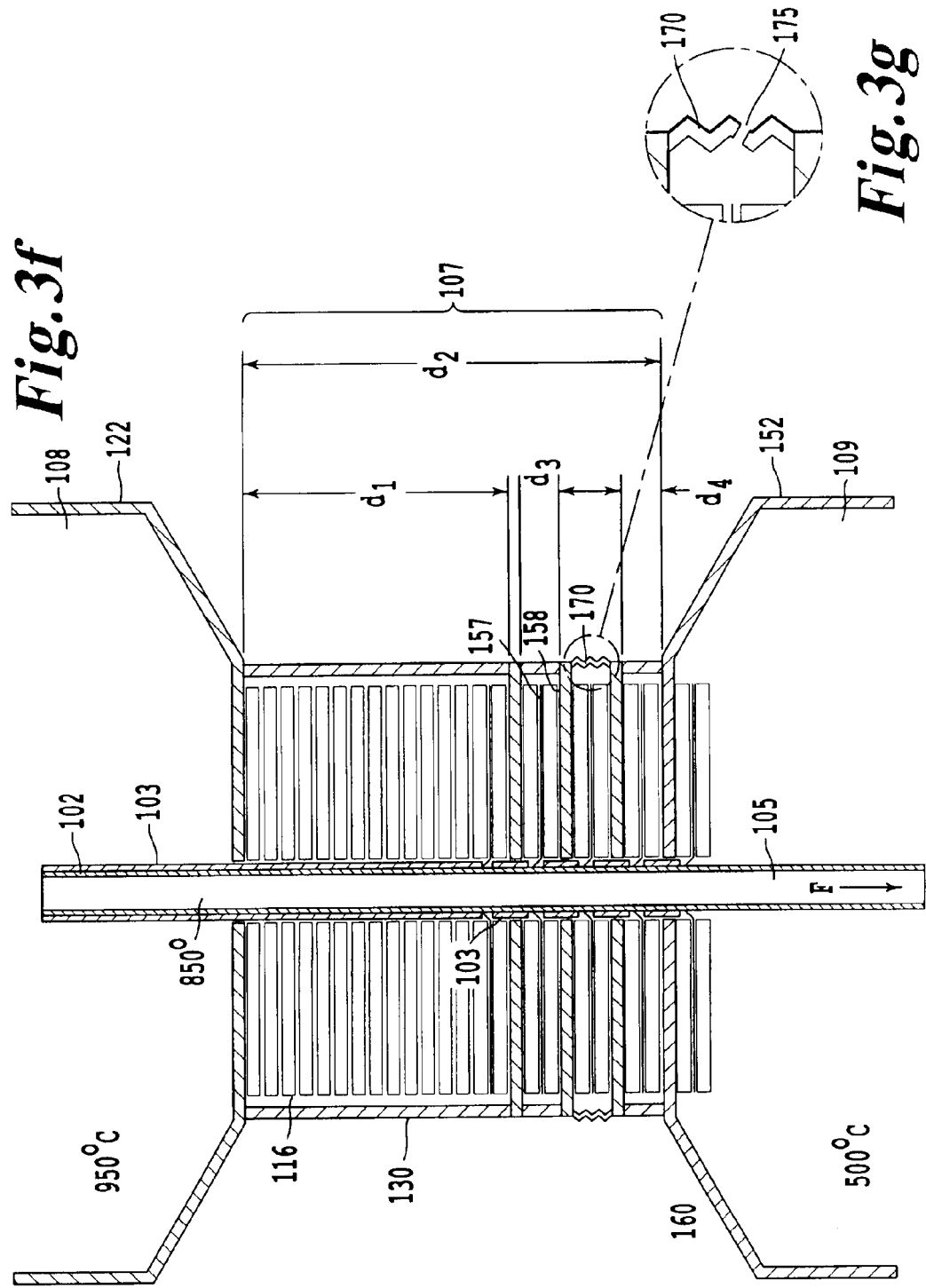

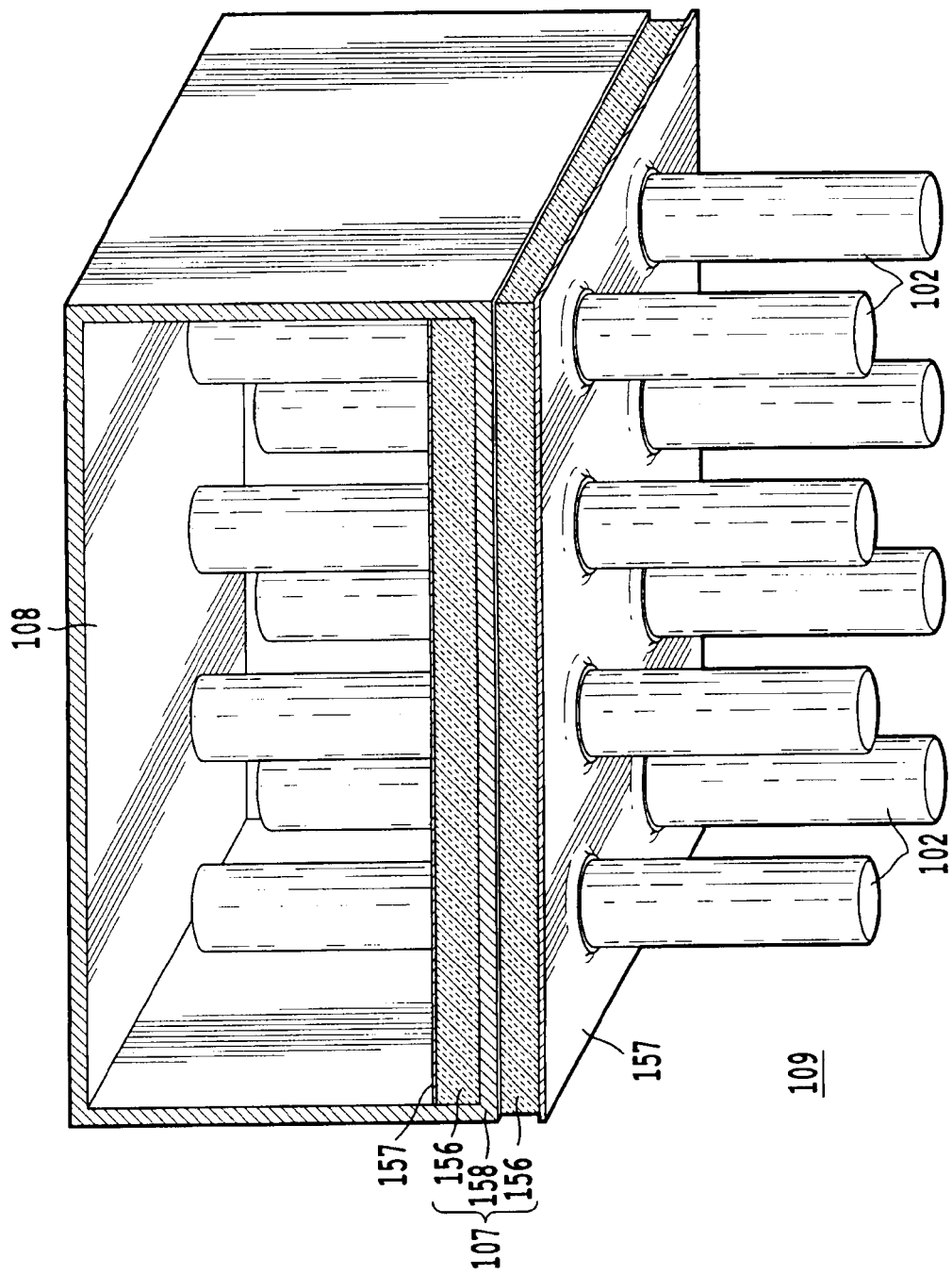

METHOD AND DEVICE FOR MINIMIZING ADVERSE EFFECTS OF TEMPERATURE DIFFERENTIAL IN A HEAT EXCHANGER OR HEAT EXCHANGE REACTOR

BACKGROUND OF THE INVENTION

1. Field of the Invention

The present invention relates generally to heat exchangers and methods of constructing heat exchangers.

2. Description of the Related Art

Heat exchangers and heat exchange chemical reactors having large arrays of parallel tubes are used for a variety of industrial processes for transferring heat to a substance without directly exposing the substance to a heat source such as a flame or electrical element. Some heat exchangers are designed in a "tube and shell" arrangement with tubes disposed within a larger container called a shell. A first fluid flows within the tubes. A second fluid, the "shell-side fluid", such as a gas or liquid, is disposed within the shell, but outside the tubes. The first fluid either absorbs heat from or transfers heat to the second fluid as the first fluid passes in one end of the tubes and out the other.

Some tube and shell heat exchangers include various zones in which the intended heat transfer differs from other zones. In one example, an upstream or intermediate zone provides a first amount of heat transfer by using the second high (low) temperature fluid on the shell side, and another zone, perhaps downstream, provides a different amount of heat transfer by using a third high (low) temperature fluid on the shell side.

Heat exchange chemical reactors are often employed to carry out chemical reactions where significant quantities of heat must be added or removed from a first reacting fluid to a second heat transfer fluid, which may or may not be reacting. These heat exchange reactors often bear a strong resemblance to simple heat exchangers, but may be provided with additional features such as fixed beds of catalysts, specialized flow path designs, exotic materials and the like.

An example of a reaction conducted in heat exchange chemical reactors is the steam reformation of hydrocarbon feed stocks to produce hydrogen-containing gas mixtures. In this process, a mixture of steam and hydrocarbon is passed through one fluid circuit while a hot fluid, usually combustion product, flows through a separate fluid circuit and transfers heat into the reacting first fluid to promote the highly endothermic steam reforming reaction. An example of a plate-fin type hydrocarbon steam reformer is shown in U.S. Pat. No. 5,733,347 to Lesieur. Several examples of tubular heat exchange reformers have been revealed, for example U.S. Pat. No. 3,446,594 to Buswell et al. An advanced tubular reformer configuration which offers significant advantages over other configurations is described in U.S. Pat. Nos. 6,497,856, 6,896,041, 6,957,695, 6,896,041, and 7,117,934 to Lomax, et al., which are incorporated herein by reference in their entirety.

The present inventors have determined that many heat exchange reactors face a serious mechanical design challenge due to the temperature differences between the reacting first fluid and the second heat transfer fluid or from one temperature zone in the heat exchange reactor to the next temperature zone. These temperature differences create thermal strains, or displacements, due to differential expansion of the material of construction of the heat exchange reactor.

The thermal stresses are particularly acute in hydrocarbon steam reformers because the temperature gradients are generally very high. Further, modern heat exchange reactors for steam reforming are designed to reduce the physical size of the reactor to reduce cost and facilitate their employment in space and weight sensitive applications such as vehicles. The reduction in physical size results in an aggravation of the problem of thermal stresses by drastically decreasing the distance across which the thermal gradients occur.

In tubular heat exchange reactors in general, and in the improved reactor of U.S. Pat. No. 6,497,856 in particular, one route to achieving a more compact reactor is the provision of baffles to induce flow of the second fluid in a direction substantially normal or perpendicular to the axis of the tubes. Such a flow arrangement is termed "cross-flow." By placing several baffle features along the length of the heat exchange reactor tubes, the second heat exchange fluid may be induced to flow across the tube array several times. Through optimal selection of the number and spacing of baffles, the mechanical configuration of a tubular heat exchange reactor may be optimized for factors such as physical size, second fluid pressure drop, and other important features.

Because of differences in the thermal expansion of the tubes disposed within the baffles, expansion of the baffles themselves, and expansion of the support structure during heating, certain baffles have a tendency to push the tubes laterally (parallel to the long axes of the baffle) thus distorting the heat exchanger. In order to remedy this distortion problem, U.S. Pat. No. 7,117,934 incorporates a plurality of holes with varied shapes, increased size, and/or offset centers from the tubes disposed within the baffles. The varied shapes, increased size, and/or offset centers allow for different amounts of thermal expansion between the baffle plate and tubes while reducing or preventing lateral distortion of the tubes by the baffle plate.

The use of holes with varied shapes, increased size, and/or offset centers from the tubes disposed within the baffles may introduce leakage of the second fluid in a direction parallel to the longitudinal axis of the tubes. In other words, while the baffles still cause most of the flow of the second fluid in a direction perpendicular to the tubes (cross-flow), the offset or oversize holes in the baffles allow some of the second fluid to travel along the outer surface of the tubes to traverse the baffle in a direction parallel to the longitudinal axis of the tubes.

Fins may be attached to the tubes to increase the heat transfer rate from the tubes to the shell-side fluid, but depending on the manner in which the fins are attached to the tubes, the fins may not prevent or sufficiently reduce the leakage in the longitudinal direction of the tubes. For example, to save cost, the fins may not be welded to the tubes, but instead press-fit or shrink-fit to the tubes. Therefore, the fins are not integrally attached to the tubes and remain separate components with a possible open seam or gap allowing leakage in the longitudinal direction between the fins and tubes.

The above-noted leakage along the longitudinal axis of the tubes can reduce the effectiveness of the zones in maintaining different temperatures of second fluid. For example, as noted above, in some cases, an upstream or intermediate zone uses a high temperature fluid on the shell side, and a downstream zone uses a lower temperature fluid on the shell side.

FIGS. 1a and 1b show one example of a conventional heat exchange reactor. FIG. 1b shows the core 101 of a reactor with a second pair of cross-flow fluid passageways 109, which is on a shell side of the array of tubes 2 and is typically operated at a temperature different, e.g., lower temperature, than a first serial array of cross-flow fluid passageways 108, which is also on a shell side of the array of tubes 2. Thus, the first and second cross-flow passageways comprise first and second temperature zones.

If leakage occurs along the direction of the longitudinal axis of the tubes, then the lower temperature fluid in the second cross-flow fluid passageway 109 can leak into the higher temperature first cross-flow fluid passageway and have a deleterious cooling effect on the upstream zone. This problem is even more undesirable if the second fluid in the upstream zone has a different chemical composition than the second fluid in the downstream zone.

In order to prevent or reduce the above-noted leakage of second fluid between the upstream and downstream zones, U.S. Pat. No. 6,957,695 provides a series of refractory sheets, which can be, for example, a felt material. FIG. 2 represents an embodiment of the apparatus described in U.S. Pat. No. 6,957,695.

As shown in FIG. 2, the refractory felt seal 16 is stacked between the first or upper fluid passage 8, which is a high temperature zone at a first pressure, and a second or lower fluid passage 9, which is a relatively low temperature zone at a second, higher pressure. Refractory felt seal 16 sometimes allows excessive leakage along the outer surface of the tubes, which causes an undesirable and unintended rapid cooling of the array of tubes 2. This undesirable cooling is especially deleterious if the heat exchanger is a steam reforming heat exchange reactor, as it causes a non-linear impact on the thermodynamic limits to conversion of the hydrocarbon reactant.

Background FIG. 2 is a side section view of the heat exchanger sealing zone 7 of a background heat exchange reactor as described in U.S. Pat. No. 6,957,695. The sealing zone 7 is defined by baffle plates 13 and 15. FIG. 2 shows an array of substantially parallel tubes 2 with the associated plate fins 10. Cover plates 30 are also visible and are joined to the extended baffle plate 15 and the full baffle plate 13.

The baffle plates have local gaps between surfaces of the holes therethrough and the tubes of the tube array 2 that pass through the holes. Additional gaps 50 may exist between refractory felt seals 16 and the cover pan wall within the sealing zone 7. The gaps, which are typically provided by oversizing tube holes in the baffles, create fluid leak paths which lead to fluid leakage between the first cross-flow fluid passageway 8 and the second cross-flow fluid passageway 9. These two passageways may convey the same fluid or two different fluids, but in either case it is likely that a pressure differential will exist between the fluid passages, and leakage between the two passages will result. In certain configurations, the first cross-flow fluid passageway 8 contains a high temperature burner flue gas at a first pressure, while the second fluid passage 9 contains preheated burner air at a second, higher pressure. In this case, the refractory felt seals 16 would function to reduce leakage and thermal stresses, but leakage in the direction of the longitudinal axis of the tubes in the tube array 2 may still occur.

A sealing zone 7 including a refractory felt material as described above is especially important when the fluid in passageway 8 is at a temperature above a service limit for intumescent material of 800° C., which is sometimes used in concert with the felt material, and the fluid in passageway 9 is below the service limit for the intumescent material. The gap between the baffle plates 13 and 15 is filled with one or more layers of the refractory felt gaskets 16. One refractory felt seal 16 is in direct contact with the baffle 15, which is in contact with the fluid passageway 9. This refractory material is initially installed in sealing contact with the tubes of the tube array 2, the baffle 15, and the internal surface of the housing 100. One or more layers of intumescent material 56, which are depicted by dashed lines in FIG. 2, are then provided between the refractory material 16 and the baffle 13. The intumescent material 56 is separated from the fluid passage 8 by refractory felt seals 16, which are intended to act not only as seals, but also as a thermal insulator to prevent overheating of the intumescent material 56. The two baffles are held in essentially fixed mechanical relationship by mechanical means such as connection to baffle support rods as known in the art, by mechanical capture between layers of extended heat exchange fins in intimate contact with the array of tubes 2.

Upon heating above 300° C., the intumescent material 56 expands in a direction normal to the face of the baffles 13, 15. This expansion subjects the refractory felt seals 16 to substantial pressure, which is intended to improve their sealing effect. The gap between the substantially-parallel plates 13, 54 is filled with an intumescent material 55, which expands at elevated temperatures. This intumescent material is unique in its ability to expand at temperatures between 300° C. and 375° C., and to remain elastic at temperatures as high as 800° C. for extended exposure. Intumescent material has the property of expanding, when heated, much more noticeably in a direction normal to its thickness than in a direction parallel to its thickness. Therefore, its use as a sealing member alone or even as a primary sealing member was thought to be insufficient in a tubular array heat exchanger of the type contemplated here, and conventional heat exchanger or reactor designs incorporating the sealing zone 7 relied heavily on the refractory felt gaskets 16 instead.

As can be seen in FIG. 2, the walls 34 connect the bottom portion of the first cross-flow fluid passageway 8 and the second cross-flow fluid passageway 9. In the above-noted example, the second fluid in the first cross-flow fluid passageway 8 is intended to be at a temperature of 800° C. or higher, and the second fluid in the second cross-flow fluid passageway 9 is intended to be at a temperature of 300° C. or higher. Accordingly, the structure surrounding the first cross-flow fluid passageway 8 typically expands more during processing than does the structure surrounding the second cross-flow fluid passageway 9. Because of this difference in expansion during processing, the housing chamber 30 often warps or bows after processing so as to form a "smile" shape after processing is finished and the system has cooled.

It is believed that this bowed shape is caused by transfer of force from the structure surrounding the first cross-flow fluid passageway 8 to the second cross-flow fluid passageway 9 via the walls 34. As the structure proximate to the second fluid passage way, e.g., the extended baffle plate 15, expands during heating, the force of this expansion is transferred to the full baffle 13, which is not as hot during processing as the extended baffle plate 15. The full baffle 13 then undergoes plastic deformation. After the process is completed, the system cools, and the extended baffle 15 contracts, not yet having undergone plastic deformation or at least not to the same extent as the full baffle plate 13. Due to plastic deformation, the full baffle 13 is often longer than it was originally and causes the "smile" shape noted above. This process may then cause crinkling of the extended baffle 15.

The above-noted deformations can exacerbate the leakage issue discussed above inasmuch as the crinkling of the extended baffle plate 15 and bowing of the full baffle 13 can cause or increase misalignment of the array of tubes 2 and the holes disposed in the baffle plates.

Accordingly, it is desired to provide a heat exchanger or reactor that can provide at least two different zones of heat with an isolation or insulation zone between the different heat zones that more effectively reduces leakage along the direction of the longitudinal axes of the tubes.

Additionally, it is desired to provide a heat exchanger or reactor that reduces the transfer of mechanical forces from one heat zone to the other heat zone.

SUMMARY OF THE INVENTION

Accordingly, one aspect of the present invention provides a heat exchange apparatus including a first housing section and a second housing section. A first cross-flow fluid passageway is disposed at least partially within the first housing section and defined by an internal surface of the first housing section. The first cross-flow fluid passageway includes a first inlet and a first outlet. This aspect provides a second cross-flow fluid passageway disposed at least partially within the second housing section and including a second inlet and a second outlet. An interior fluid passageway is defined by at least one tube disposed at least partially within the first housing section and at least partially within the second housing section and extending at least partially through the first passageway and at least partially through the second passageway. The interior fluid passageway includes at least a third inlet and a third outlet. This aspect also provides a sealing zone disposed between the first housing section and the second housing section and through which sealing zone the interior fluid passageway passes. An interior of the sealing zone is in fluid communication with a vent location outside of the first housing section and second housing section.

Another aspect of the invention provides a heat exchange apparatus including a first housing section, a second housing section, and a first cross-flow fluid passageway disposed at least partially within the first housing section and defined by an internal surface of the first housing section and including a first inlet and a first outlet. This aspect of the invention provides a second cross-flow fluid passageway disposed at least partially within the second housing section and including a second inlet and a second outlet. Also included is an interior fluid passageway defined by at least one tube disposed at least partially within the first housing section and at least partially within the second housing section, extending at least partially through the first passageway and at least partially through the second passageway, and including at least a third inlet and a third outlet. This aspect of the invention provides means for reducing transmission of shear stress from the first housing section to the second housing section, the means for reducing transmission of shear stress being disposed between the first housing section and the second housing section and through which the interior fluid passageway passes.

A heat exchange reactor including a first housing section and a second housing section. The reactor includes a first cross-flow fluid passageway disposed at least partially within the first housing section and defined by an internal surface of the first housing section and including a first inlet and a first outlet. The reactor includes a second cross-flow fluid passageway disposed at least partially within the second housing section and including a second inlet and a second outlet. This aspect of the invention provides an interior fluid passageway defined by at least one tube disposed at least partially within the first housing section and at least partially within the second housing section. The interior fluid passageway extends at least partially through the first passageway and at least partially through the second passageway and includes at least a third inlet and a third outlet. This aspect also includes an isolation compartment disposed between the first housing section and the second housing section and through which isolation compartment the interior fluid passageway passes, an interior of the isolation compartment including at least one fluid redirection assembly. The fluid redirection assembly includes at least one layer of intumescent material with first and second sides, at least one baffle separated from the first and second housing sections, and at least one fin. The first side of the intumescent material is in contact with the first side of the at least one baffle, and the second side of the intumescent material is disposed in contact with the second side of the at least one fin.

BRIEF DESCRIPTION OF THE DRAWINGS

These and other advantages of the invention will become more apparent and more readily appreciated from the following detailed description of the exemplary embodiments of the invention taken in conjunction with the accompanying drawings where:

FIG. 3b is a front section view of a mechanical isolation arrangement according to the invention;

FIGS. 3c-3e are front detailed views of the isolation arrangement shown in FIG. 3b;

FIGS. 3f-3g are front section views of another mechanical isolation arrangement according to the invention;

FIG. 4 is a perspective section view of one arrangement of a thermal/fluid isolation material according to the invention;

DETAILED DESCRIPTION OF THE PREFERRED EMBODIMENTS

Figure 1A:
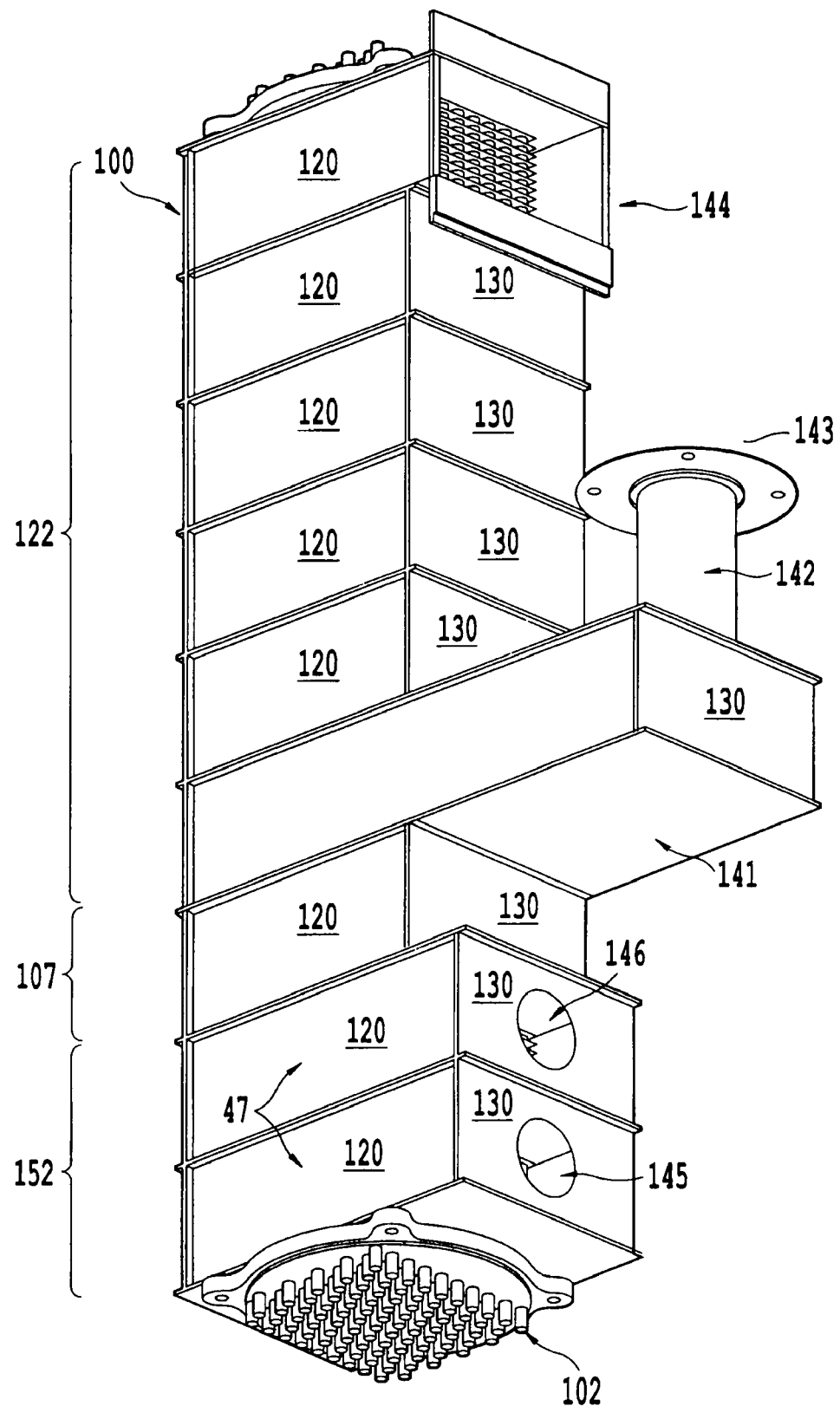
FIG. 1a is a perspective view of a heat exchange apparatus according to one embodiment of the invention.

Embodiments of the present invention will be described hereinafter with reference to the accompanying drawings. In the following description, the constituent elements having substantially the same function and arrangement are denoted by the same reference numerals, and repetitive descriptions will be made only when necessary.

With reference to FIG. 1a, one example of a heat exchange reactor according to an embodiment of the present invention is shown in a perspective view. In the example shown in FIG. 1a, an array of tubes 102 configured to carry a first fluid are disposed within a housing 100. The tubes 102 are typically arranged parallel to each other within the housing 100. The housing 100 is configured to carry a second ("shell-side") fluid and includes first cover pans 120 and second cover pans 130. As shown in FIG. 1a, these cover pans are connected to form segments of the housing 100. However, in alternate embodiments the housing can be a single continuous structure or formed by known methods of joining differently shaped panels or sheet metal.

In the example depicted in FIG. 1a, the housing 100 includes a first housing section 122 and a second housing section 152. The first housing section 122 includes a first port 143 and a second port 144 through which the shell-side fluid enters and exits the first housing, respectively. The direction of flow of the shell-side fluid may also be in the reverse of the above-noted direction. Additionally, the location of the first and second ports 143 and 144 may be different than described in FIG. 1*a*.

The first housing section 122 depicted in FIG. 1*a* includes a burner box 141. In this example, the burner box is used to contain a combustion reaction of the shell-side fluid during which the tubes 102 are exposed to a relatively high level of heat. The shell-side fluid flows into the first housing section 122 through a burner flame tube 142 and combusts inside the burner box 141. Exhaust products from the combustion flow out the first housing outlet 144. This process typically transfers heat to the first fluid, which is inside the tubes 102. In the embodiment shown in FIG. 1*a*, the first fluid flows in a downward direction, but flow may occur in the upward direction instead, depending on the needs of the particular reactor or heat exchanger. The pressure of the shell-side fluid in the first housing section 122 is typically higher than the pressure in the environment outside the housing 100. In one example, the temperature of the shell-side fluid inside the first housing section 122 during normal operation is approximately 950° C. and the temperature of the first fluid inside the tubes 102 is approximately 850° C.

FIG. 1*a* also depicts a sealing zone 107 that separates first housing section 122 from a second housing section 152. The tubes 102 pass through the first housing section 122, then pass through the sealing zone 107, and then pass through the second housing section 152. In the example shown in FIG. 1*a* the second housing section 152 includes a second housing inlet 145 and a second housing outlet 146. The pressure inside the second housing section 152 is typically higher than the pressure in the environment outside the housing 100, and in many cases, is higher than the pressure inside the first housing section 122. In one example, the temperature inside the second housing section 152 during normal operation is approximately 500° C.

Figure 1B:
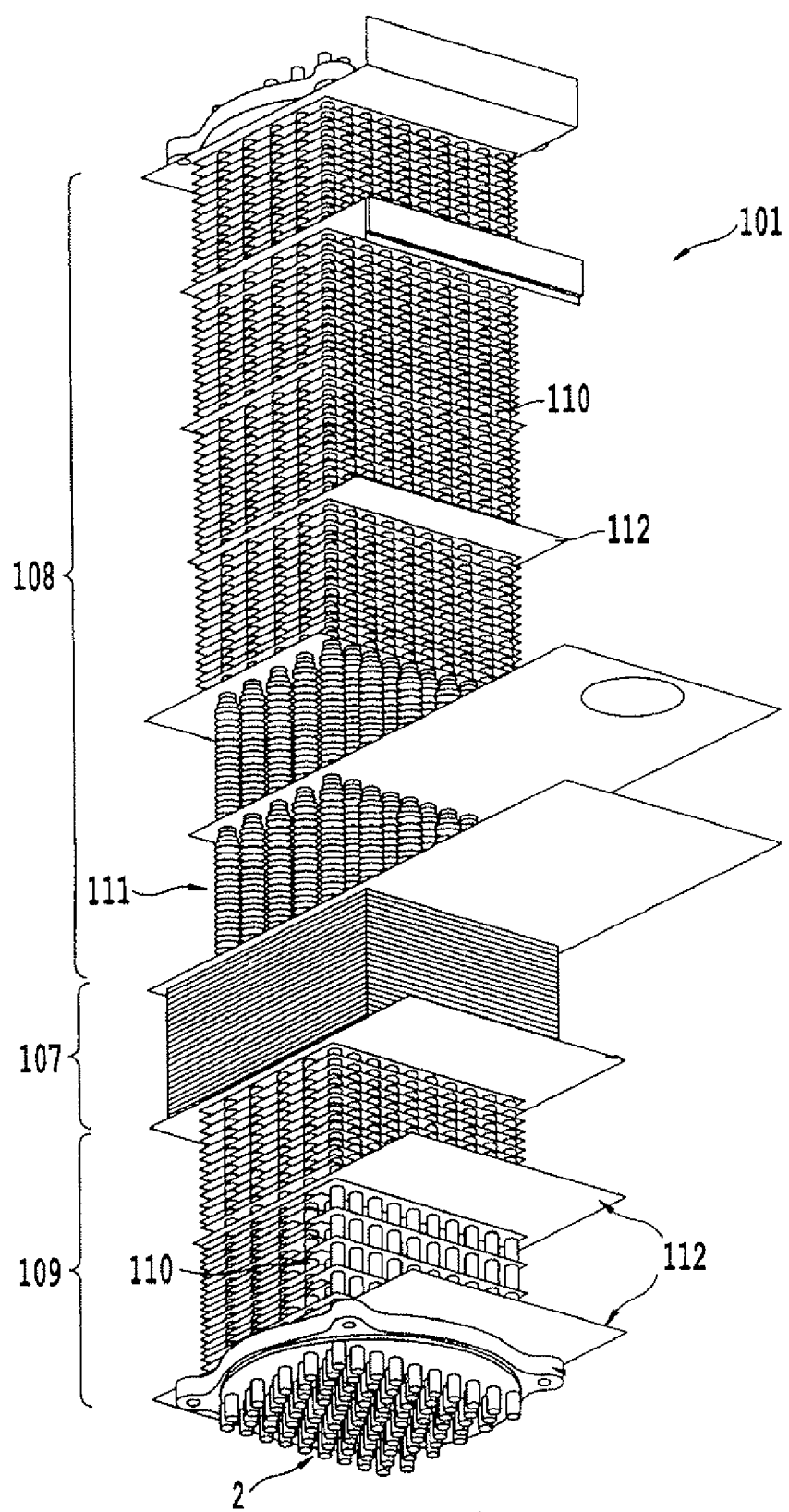
FIG. 1b is a perspective view of the apparatus of FIG. 1a with an outer shell removed.
Figure 2:
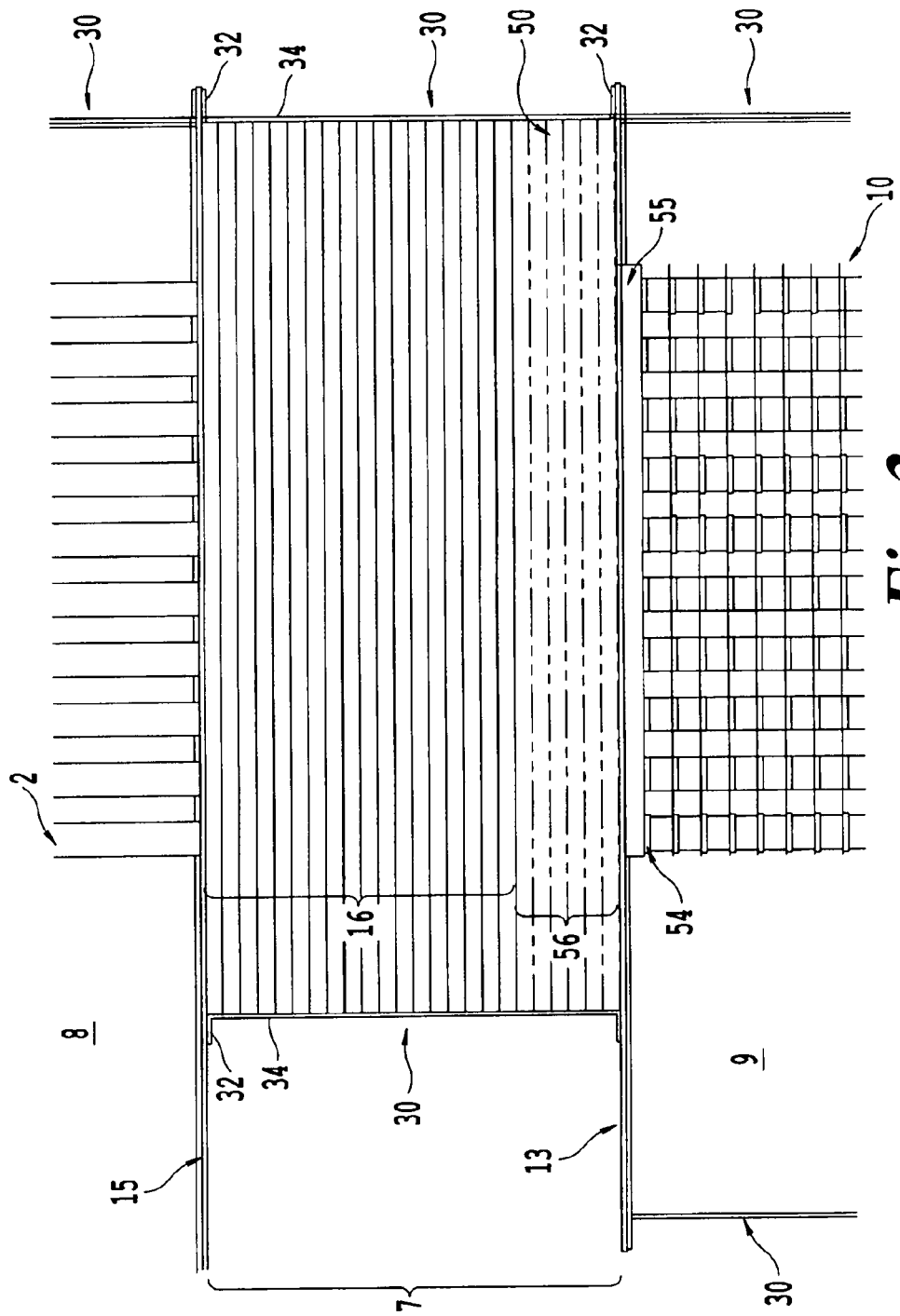
FIG. 2 is a front view of an isolation zone of a background apparatus.

As shown in FIG. 1*b*, the area inside the first housing section 122 includes a first cross-flow fluid passageway 108. In the first cross-flow fluid passageway 108 in the embodiment depicted in FIG. 1*b*, the shell-side fluid flows from the bottom of the first cross-flow fluid passageway 108 to the top through a series of baffles 112, ring fins 111, and plate fins 110, which, in combination, cause the shell-side fluid inside the first cross-flow fluid passageway 108 to move in a direction perpendicular to the surface of the tubes 102 to improve the efficiency of heat transfer between the first and second (shell-side) fluids.

Figure 3A:
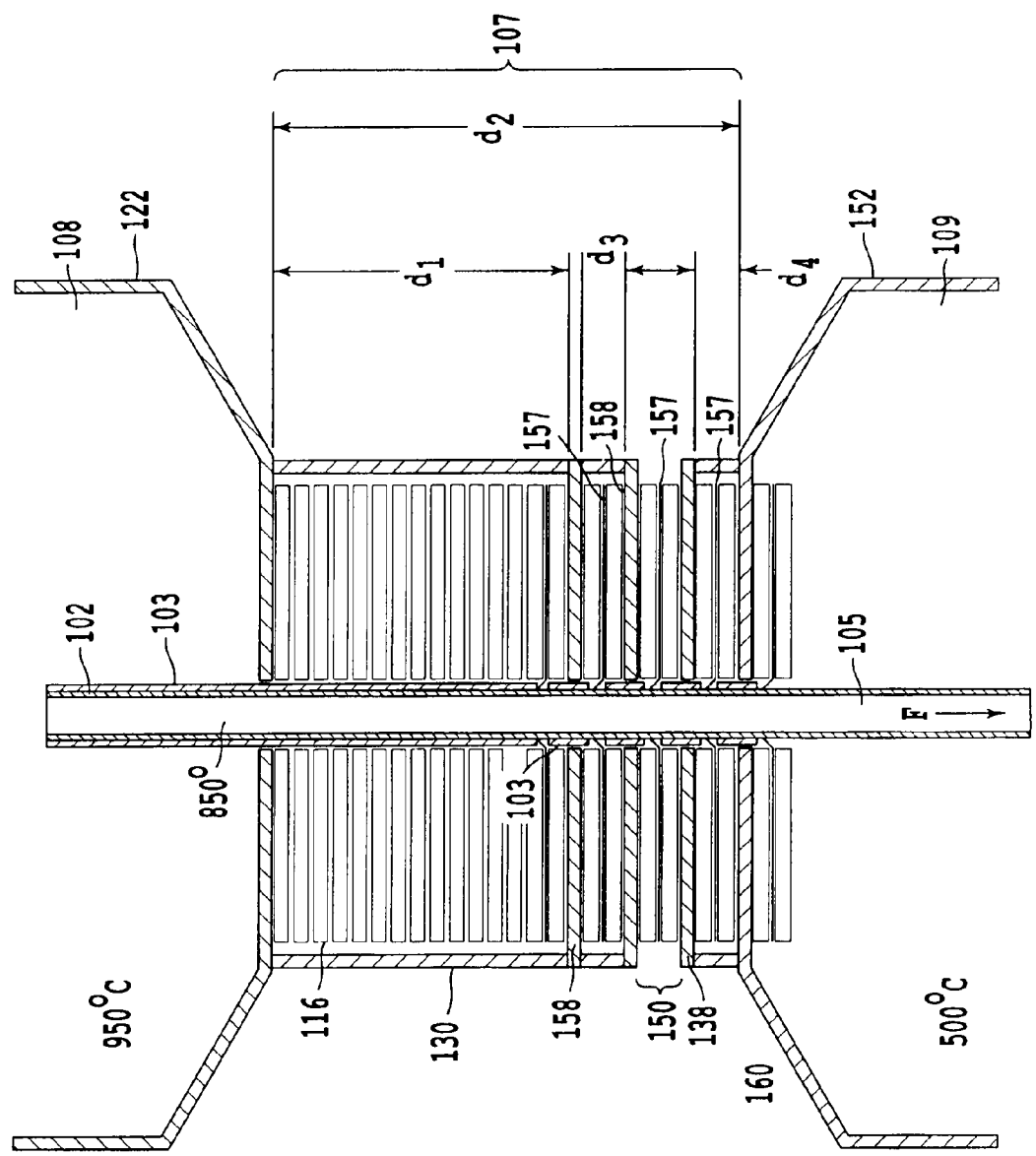
FIG. 3a is a front section view of an isolation zone of one aspect of the invention.

FIG. 3*a* depicts one exemplary embodiment of the arrangement of tubes, fins, various layers of insulation, and baffles provided in the sealing zone 107. The tubes 102 are surrounded, in various segments, by sleeves 103 and flow of the first fluid 105 inside the tubes 102 is typically in the direction shown by the arrow F. In this example, the cover pan 130 and cover pan 120 (shown in FIG. 1*a*) define the interior of the sealing zone and includes a vent 150 that places the interior of the sealing zone in fluid communication with a vent area 160 outside the sealing zone. As discussed above, the shell-side fluid inside the first cross-flow fluid passageway 108 and/or the second cross flow fluid passageway 109 may be at a pressure higher than the ambient pressure outside the housing. Further, leakage of shell-side fluid between the second and first cross flow passageways along the longitudinal (length) direction of the tubes 102 may occur. If the sealing zone 107 does not provide sufficient fluid communication with an area outside the housing 100, then it is possible that the shell-side fluid from the second cross-flow fluid passageway 109 will travel along the tubes 107 and into the first cross-flow fluid passageway 108.

In many cases, the pressure of the shell-side fluid inside the second cross-flow fluid passageway 109 will be greater than the pressure of the shell-side in the first cross-flow fluid passageway 108. Thus, leakage of the shell-side fluid from the second cross-flow fluid passageway 109 occurs and ventilation is not present to divert the leakage to another location, the shell-side fluid from the second cross-flow fluid passageway 109 may travel along the tubes 102 and contaminate the second cross-flow fluid passageway 109. Such leakage is particularly undesirable when the shell-side fluid in the first cross-flow fluid passageway 108 has a different composition or temperature from the shell-side fluid in the second cross-flow fluid passageway 109. Thus, as shown in FIG. 3*a*, the sealing zone 107 is provided with a vent 150, which allows shell-side fluid from both of the first and second cross-flow fluid passageways to exit to a vent location 160 instead of entering the opposing cross-flow fluid passageway. The upper part of the sealing zone 107 includes multiple layers of refractory felt seals 116, and the lower part includes layers intumescent material 156 sandwiched between fins 157 and baffles 158.

In the example shown in FIG. 3*a*, the vent 150 extends around an entire periphery of the sealing zone 107. In other words, the first housing section 122 is completely separated (other than non-sealing support structure and structure related to the tubes 102) from the second housing section 152 by the vent 150 in this example.

In the non-limiting example shown in FIG. 3*a* and the figures following it, the overall inner dimension $d_2$ of the sealing zone 107 is 4.775 inches, although other dimensions are possible, depending on the size of the overall system. The height of the area including the two layers of intumescent material 156 closest to the refractory felt seals 116, $d_3$, is typically approximately (within 25% of) 0.45 inches. The inner height of the area $d_1$, in which multiple layers of refractory felt seals 116 are typically approximately 3 inches. In the embodiment of FIG. 3*a*, the lowest part of the sealing zone includes two layers of intumescent material 156 sandwiching a fin 157 and typically has an inner height $d_4$ which is less than or equal to the sum of the thickness of the fin 157 and the uncompressed intumescent layers 156 at standard conditions. Of course, other dimensions are possible for $d_1$-$d_4$.

As it is sometimes desirable to operate the first cross-flow fluid passageway 108 and first housing section 122 at a temperature significantly higher than a temperature of the second cross-flow fluid passageway 109 and second housing section 152, expansion in the first housing section 122 can plastically deform the second housing section 152 when force is transmitted from the first housing section 122 through the cover pans 120 and 130. Accordingly, one benefit of providing the vent 150 around an entire periphery of the sealing zone 107 is to mechanically isolate, or to at least reduce the transmission of shear stress between the two housing sections from each other. In other words, the vent 150 reduces or eliminates plastic deformation of one housing section relative to the other due to differences in thermal expansion of the housing sections because the vent section 150 transmits little or no shear stress between the housings 152 and 122.

FIGS. 3*b* and 3*c* depict another example of the sealing zone 107. In this example, the cover pan 130 is connected to an upper slidable flange 161 that abuts a lower slidable flange 162 attached to the second housing section 152. The cover pan 120 is connected to a slidable flange in a similar manner. This combination of flanges reduces transmission of shear stress from one housing section to another. In a variation of the above-noted arrangement, the lower slidable flange 162 is connected to its own cover pans 120 and 130, which are in turn coupled to the second housing section 152.

In the example shown in FIGS. 3b and 3c, the two slidable flanges 161 and 162 are configured to slide relative to each other in order to accommodate differences in expansion between the first housing section 122 and second housing section 152 because they transmit little or no shear stress. Preferably, the two slidable flanges 161 and 162 overlap enough to allow a difference in expansion of at least 0.05% in relative change in dimension between the first housing section 122 and the second housing section 152. More preferably the two flanges allow at least 0.1% of relative change in dimension.

In an enhancement of the flange arrangement shown in FIG. 3c, the upper slidable flange 161 may be separated from the lower slidable flange 162 by a band 165 as shown in FIG. 3d. The band 165, in a preferred embodiment, is a material with a relatively low friction coefficient. In one example, the band 165 is a porous material and allows venting of any leakage of the shell-side fluid from either of the first cross-flow fluid passageway 108 and second cross-flow fluid passageway 109. In another embodiment, the band 165 is replaceable, should it wear with repeated thermal cycles.

Another feature available in the flange arrangement described above is shown in FIG. 3e where a port 168 is provided in or near one of the upper and lower slidable flanges 161 and 162 to allow venting to the vent location 160. This port 168 can be used with or without the band 165, and may be incorporated into the band 165 itself.

FIGS. 3f and 3g show an embodiment of the invention including a bellows 170 connecting the cover panel 130 to the second housing section 152. The bellows 170 allows both longitudinal and lateral (horizontal in FIG. 3f) movement of the first housing section 122 relative to the second housing section 152. In one example, the bellows 170 includes at least one orifice 175, which allows venting of fluid inside the sealing zone 107 to escape to the vent location 160. Accordingly, the embodiment of the invention depicted in FIGS. 3f and 3g provides both mechanical isolation and fluid venting to the housing 100. The example depicted in FIG. 3f shows one orifice 175. However, more than one orifice 175 may be provided.

Advantageously, the bellows 170 transmits little or no shear stress. In one example, at least one vent orifice 175 can be combined with the cover pan 130 even if the bellows 170 transmits significant shear stress, or is not present at all.

Figure 3H:
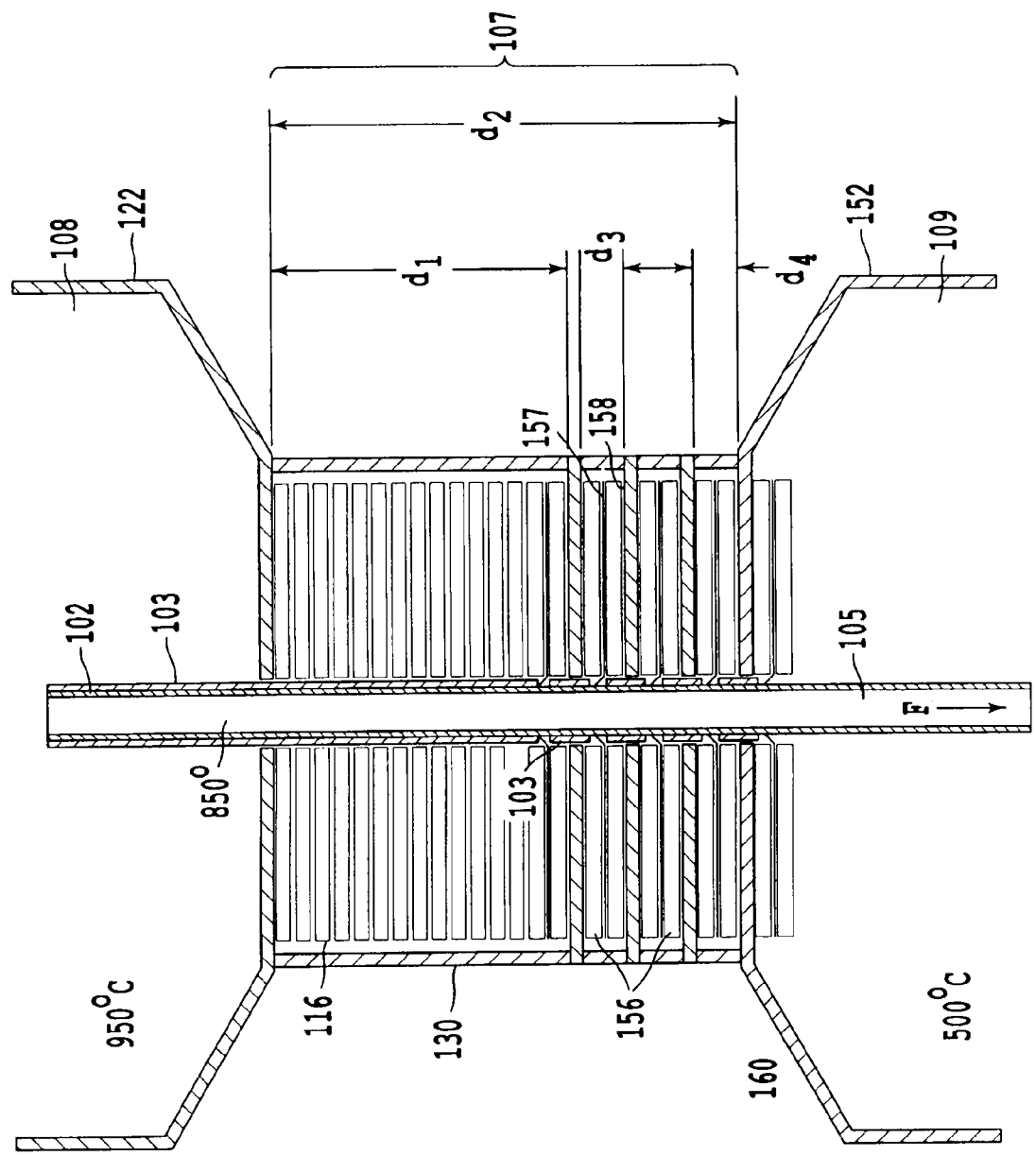
FIG. 3h is a front section view of a thermal/fluid isolation arrangement according to one aspect of the invention.

FIG. 3h shows one embodiment of the sealing zone providing multiple layers of intumescent mat 156. As shown in FIG. 3h, each layer of intumescent mat 156 is disposed between a sealing zone fin 157 and a sealing zone baffle 158.

FIGS. 4-7 describe embodiments of the invention implemented without structure designed to allow free movement and reduced transmission/freedom from transmission of shear stress between the first housing section 122 and second housing section 152. However, the description of the various layers of fins, baffles, and thermal insulation material provided in FIGS. 4-7 can be implemented in combination with any of the previously described embodiments, including those with structure designed to allow expansion of the first housing section 122 relative to the second housing section 152.

FIG. 4 depicts one arrangement in which a fin 157 is disposed above a layer of intumescent mat 156, which is in turn disposed above another layer of intumescent mat 156. A final sealing zone fin 157 is disposed beneath the lower layer of intumescent mat 156.

Figure 5:
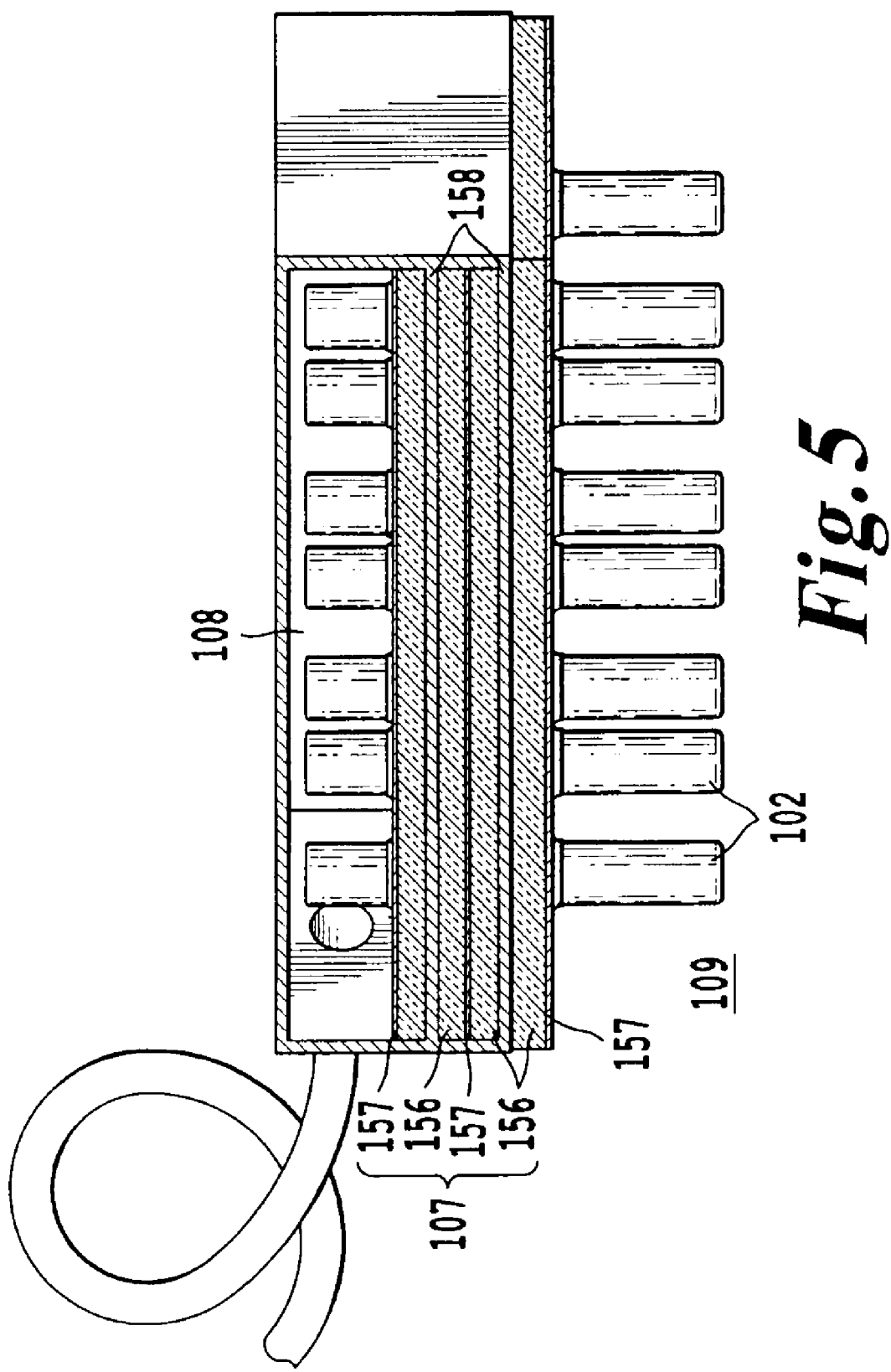
FIG. 5 is a perspective section view of another arrangement of thermal/fluid isolation material according to one aspect of the invention.

FIG. 5 depicts another possible arrangement of the intumescent mat 156 and fins 157. In this example, three layers of intumescent mat 156 are sandwiched between fins 157 and the baffles 158.

Figure 6:
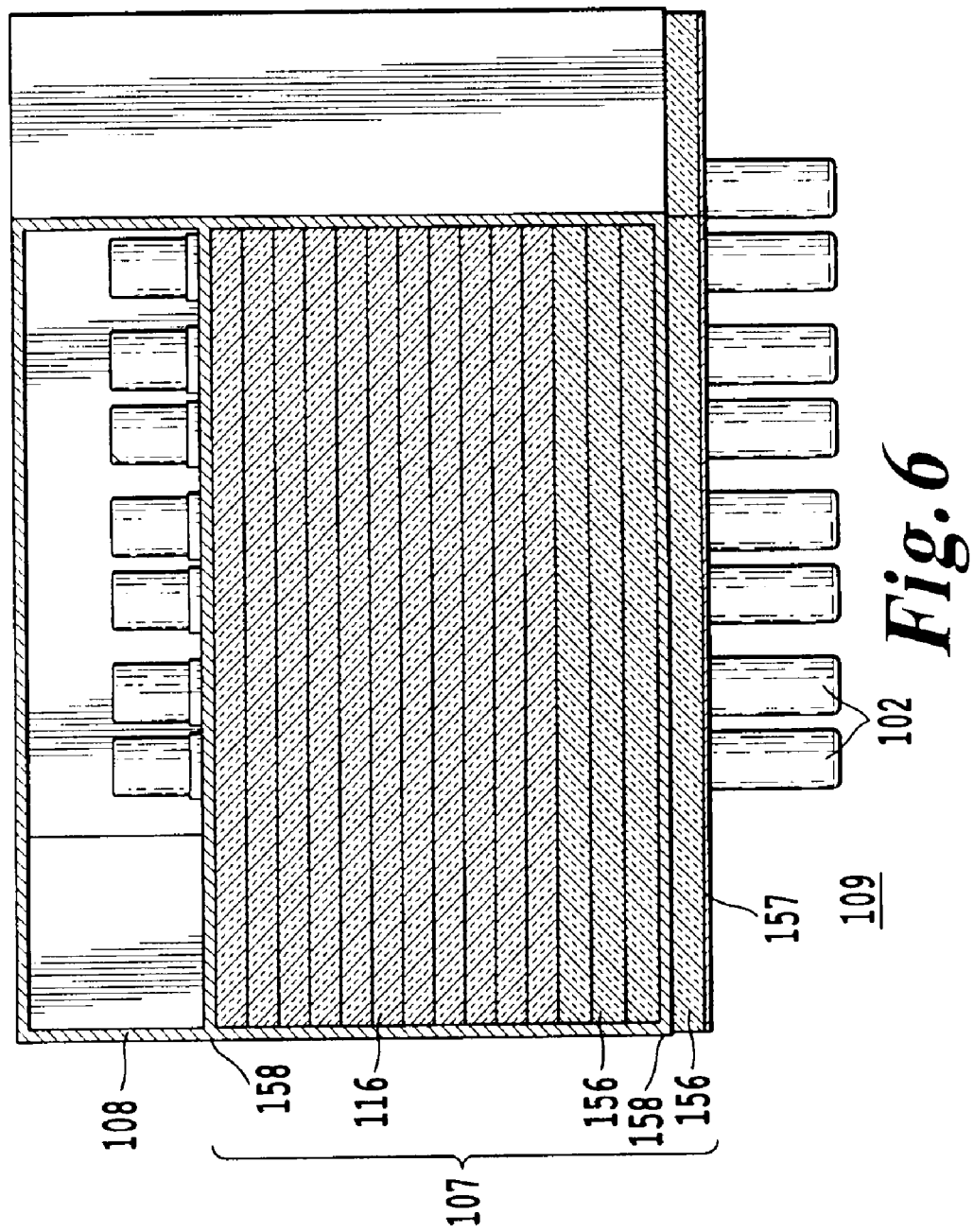
FIG. 6 is a perspective section view of an arrangement of thermal/fluid isolation material according to another aspect of the invention.

FIG. 6 depicts another arrangement of the intumescent mat 156 and fins 157. In this arrangement, the sealing zone 107 includes multiple layers of refractory felt seals 116 disposed above multiple layers of intumescent mat 156. A final layer of intumescent mat 156 is sandwiched between the baffle 158 and fin 157.

Figure 7:
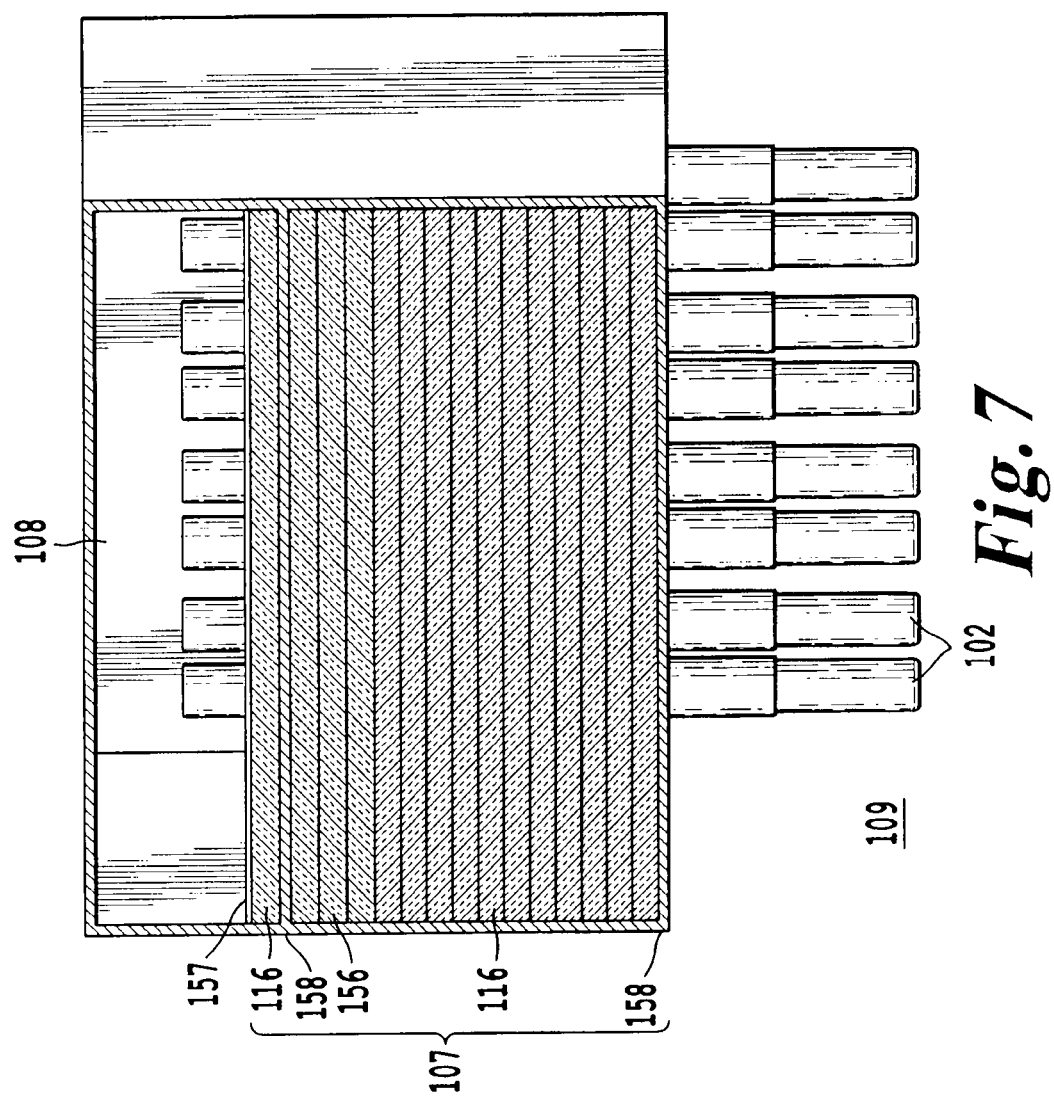
FIG. 7 is a perspective section view of arrangement of thermal/fluid isolation material according to another aspect of the invention.

FIG. 7 depicts another arrangement of the sealing zone 107 in which a fin 157 is disposed above a layer of felt seal 116, which rests on a baffle 158. Multiple layers of intumescent mat 156 are disposed beneath the baffle 158. Below the multiple layers of intumescent mat 158 are disposed additional layers of felt seals 116.

Although only certain embodiments of this invention have been described in detail above, those skilled in the art will readily appreciate that many modifications are possible in the exemplary embodiment without materially departing from the novel teachings and advantages of this invention. Accordingly, all such modifications are intended to be included within the scope of this invention.

The invention claimed is:

1. A heat exchange apparatus comprising: a first housing section; a second housing section; a first cross-flow fluid passageway disposed at least partially within the first housing section and defined by an internal surface of the first housing section and including a first inlet and a first outlet; a second cross-flow fluid passageway disposed at least partially within the second housing section and including a second inlet and a second outlet; an interior fluid passageway defined by at least one tube disposed at least partially within the first housing section and at least partially within the second housing section, extending at least partially through the first passageway and at least partially through the second passageway, and including at least a third inlet and a third outlet; and means for reducing transmission of shear stress from the first housing section to the second housing section, the means for reducing transmission of shear stress being disposed between the first housing section and the second housing section, wherein the at least one tube passes through the means for reducing transmission of shear stress, wherein the means for reducing transmission of shear stress includes a vent fluidly connecting an area internal to the means for reducing transmission of shear stress with an area external to the means for reducing transmission of shear stress.

2. The heat exchange apparatus according to claim 1, wherein the vent includes a gap disposed between the first housing section and second housing section.

3. The heat exchange apparatus according to claim 1, wherein the first housing section does not contact the second housing section.

* * * * *